(12) United States Patent
Stuart et al.

(10) Patent No.: US 8,583,881 B1
(45) Date of Patent: Nov. 12, 2013

(54) METHOD, SYSTEM, AND PROGRAM FOR IMPLEMENTING RETENTION POLICIES TO ARCHIVE RECORDS

(71) Applicants: Alan L. Stuart, Scarsdale, NY (US); Toby Lyn Marek, Santa Clara, CA (US); Avishai Haim Hochberg, San Jose, CA (US); David Maxwell Cannon, Tucson, AZ (US); Howard Newton Martin, Vail, AZ (US)

(72) Inventors: Alan L. Stuart, Scarsdale, NY (US); Toby Lyn Marek, Santa Clara, CA (US); Avishai Haim Hochberg, San Jose, CA (US); David Maxwell Cannon, Tucson, AZ (US); Howard Newton Martin, Vail, AZ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/632,454

(22) Filed: Oct. 1, 2012

Related U.S. Application Data

(63) Continuation of application No. 12/350,198, filed on Jan. 7, 2009, now Pat. No. 8,281,087, which is a continuation of application No. 11/465,630, filed on Aug. 18, 2006, now Pat. No. 7,526,621, which is a continuation of application No. 10/737,367, filed on Dec. 15, 2003, now Pat. No. 7,107,416, which is a continuation-in-part of application No. 10/681,558, filed on Oct. 7, 2003, now Pat. No. 7,146,388, which is a continuation-in-part of application No. 10/658,487, filed on Sep. 8, 2003, now Pat. No. 7,117,322.

(51) Int. Cl.
*G06F 12/00* (2006.01)

(52) U.S. Cl.
USPC ............ 711/159; 711/154; 711/156; 707/662

(58) Field of Classification Search
USPC .......................... 711/159, 154, 156; 707/662
See application file for complete search history.

(56) References Cited

U.S. PATENT DOCUMENTS

| | | | |
|---|---|---|---|
| 4,899,299 | A | 2/1990 | MacPhail |
| 5,051,891 | A | 9/1991 | MacPhail |
| 5,107,419 | A | 4/1992 | MacPhail |
| 5,132,954 | A | 7/1992 | Kulakowski et al. |
| 5,144,556 | A | 9/1992 | Wang et al. |

(Continued)

FOREIGN PATENT DOCUMENTS

| | | |
|---|---|---|
| EP | 0947932 | 10/1999 |
| JP | 012763346 | 11/1989 |

(Continued)

OTHER PUBLICATIONS

Santry D.J. and Feeley, M.J., Elephant: The File System that Never Forgets, Hot Topics in Operating Systems, 1999, p. 2-7, Print ISBN: 0-7695-0237-7.

(Continued)

*Primary Examiner* — Stephen Elmore
(74) *Attorney, Agent, or Firm* — Young Basile Hanlon & MacFarlane P.C.

(57) ABSTRACT

A method and system for use in electronic data retention are provided. The method includes receiving, via electronic communication, a request indication indicating a request to delete, shred, purge, or remove a record from a data retention system; generating a determination, by a processor in response to instructions stored on a non-transitory storage medium, indicating that the record is associated with a hold indicator that is not based on a retention period; and sending, via electronic communication, a denial of the request in response to the determination indicating that the record is associated with a hold indicator that is not based on a retention period.

20 Claims, 11 Drawing Sheets

(56) References Cited

U.S. PATENT DOCUMENTS

| | | |
|---|---|---|
| 5,146,561 A | 9/1992 | Carey et al. |
| 5,233,576 A | 8/1993 | Curtis et al. |
| 5,276,867 A | 1/1994 | Kenley et al. |
| 5,438,661 A | 8/1995 | Ogawa |
| 5,457,796 A | 10/1995 | Thompson |
| 5,463,772 A | 10/1995 | Thompson et al. |
| 5,495,603 A | 2/1996 | Fruchtman et al. |
| 5,495,607 A | 2/1996 | Pisello et al. |
| 5,506,986 A | 4/1996 | Healy |
| 5,617,566 A | 4/1997 | Malcolm |
| 5,678,042 A | 10/1997 | Pisello et al. |
| 5,689,699 A | 11/1997 | Howell et al. |
| 5,813,009 A | 9/1998 | Johnson et al. |
| 5,925,126 A | 7/1999 | Hsieh |
| 5,983,239 A | 11/1999 | Cannon |
| 5,991,753 A | 11/1999 | Wilde |
| 6,185,576 B1 | 2/2001 | McIntosh |
| 6,240,421 B1 | 5/2001 | Stolarz |
| 6,266,679 B1 | 7/2001 | Szalwinski et al. |
| 6,272,086 B1 | 8/2001 | Jaquette et al. |
| 6,286,013 B1 | 9/2001 | Reynolds et al. |
| 6,301,670 B1 | 10/2001 | Motoyama et al. |
| 6,321,219 B1 | 11/2001 | Gainer et al. |
| 6,324,569 B1 | 11/2001 | Ogilvie et al. |
| 6,330,572 B1 | 12/2001 | Sitka |
| 6,336,120 B1 | 1/2002 | Noddings et al. |
| 6,438,642 B1 | 8/2002 | Shaath |
| 6,519,679 B2 | 2/2003 | Devireddy et al. |
| 6,546,404 B1 | 4/2003 | Davis et al. |
| 6,549,916 B1 | 4/2003 | Sedlar |
| 6,553,365 B1 | 4/2003 | Summerlin et al. |
| 6,560,615 B1 | 5/2003 | Zayas et al. |
| 6,611,900 B2 | 8/2003 | Patel et al. |
| 6,631,480 B2 | 10/2003 | Ziegler et al. |
| 6,801,921 B2 | 10/2004 | Tsuchida et al. |
| 6,871,295 B2 | 3/2005 | Ulrich et al. |
| 6,886,020 B1 | 4/2005 | Zahavi et al. |
| 7,043,506 B1 | 5/2006 | Horvitz |
| 7,065,618 B1 | 6/2006 | Ghemawat et al. |
| 7,107,298 B2 | 9/2006 | Prahlad et al. |
| 7,107,416 B2 | 9/2006 | Stuart et al. |
| 7,117,322 B2 | 10/2006 | Hochberg et al. |
| 7,136,885 B2 | 11/2006 | Wright, Jr. et al. |
| 7,146,388 B2 | 12/2006 | Stakutis et al. |
| 7,149,738 B2 | 12/2006 | Kumar et al. |
| 7,162,500 B2 | 1/2007 | Iguchi et al. |
| 7,188,127 B2 | 3/2007 | Stakutis |
| 7,191,219 B2 | 3/2007 | Udell et al. |
| 7,313,534 B2 | 12/2007 | Scheer |
| 7,313,581 B1 | 12/2007 | Bachmann et al. |
| 7,313,694 B2 | 12/2007 | Riedel et al. |
| 7,392,234 B2 | 6/2008 | Shaath et al. |
| 7,412,489 B2 * | 8/2008 | Nowacki et al. ............ 709/206 |
| 7,424,498 B1 | 9/2008 | Patterson |
| 7,475,107 B2 | 1/2009 | Maconi et al. |
| 7,478,088 B2 | 1/2009 | Summerlin et al. |
| 7,478,096 B2 | 1/2009 | Margolus et al. |
| 7,526,621 B2 | 4/2009 | Stuart et al. |
| 7,600,086 B2 | 10/2009 | Hochberg et al. |
| 7,765,177 B2 | 7/2010 | Stakutis et al. |
| 7,812,991 B2 | 10/2010 | Kato et al. |
| 7,873,602 B2 | 1/2011 | Debrunner |
| 7,933,860 B2 * | 4/2011 | Asselstine et al. ............ 726/1 |
| 8,041,698 B2 | 10/2011 | Stakutis |
| 8,234,477 B2 * | 7/2012 | Shaath ............ 711/163 |
| 8,281,087 B2 | 10/2012 | Stuart |
| 2001/0044904 A1 | 11/2001 | Berg et al. |
| 2002/0010708 A1 | 1/2002 | McIntosh |
| 2002/0046320 A1 | 4/2002 | Shaath |
| 2002/0049643 A1 | 4/2002 | Church |
| 2002/0133738 A1 | 9/2002 | Zeigler et al. |
| 2002/0143598 A1 | 10/2002 | Scheer |
| 2002/0156767 A1 | 10/2002 | Costa et al. |
| 2002/0166079 A1 | 11/2002 | Ulrich et al. |
| 2002/0174329 A1 | 11/2002 | Bowler et al. |
| 2003/0070071 A1 | 4/2003 | Riedel et al. |
| 2003/0101072 A1 | 5/2003 | Dick et al. |
| 2003/0126215 A1 | 7/2003 | Udell et al. |
| 2003/0182304 A1 | 9/2003 | Summerlin et al. |
| 2004/0006589 A1 | 1/2004 | Maconi et al. |
| 2004/0117407 A1 | 6/2004 | Kumar et al. |
| 2004/0167898 A1 | 8/2004 | Margolus et al. |
| 2005/0055518 A1 | 3/2005 | Hochberg et al. |
| 2005/0055519 A1 | 3/2005 | Stuart et al. |
| 2005/0076066 A1 | 4/2005 | Stakutis et al. |
| 2006/0282484 A1 | 12/2006 | Stakutis |
| 2006/0282630 A1 | 12/2006 | Hochberg et al. |
| 2007/0220278 A1 | 9/2007 | Nixon |
| 2008/0091739 A1 | 4/2008 | Bone et al. |
| 2009/0119354 A1 | 5/2009 | Stuart et al. |

FOREIGN PATENT DOCUMENTS

| | | |
|---|---|---|
| JP | 02002453 | 1/1990 |
| JP | 04125743 | 4/1992 |
| JP | 10143407 | 5/1998 |
| JP | 11007401 | 1/1999 |
| JP | 2001075786 | 3/2001 |
| WO | 0057275 | 9/2000 |
| WO | 0058865 | 10/2000 |
| WO | 2059723 | 8/2002 |

OTHER PUBLICATIONS

Sharick, P., Expiration dates and retention periods. Keeping your disks clean, VAX Professional, Jun. 1988, v 10, n 3, p. 15-17, ISSN: 8750-9628, USA.

Lange, M.C.S., Document retention policies can help pare legal bills, Financial Executive, Dec. 2002, v 18, n 9, 43-5, Financial Executives Inst, USA.

IT Web, "EMC Centera Compliance Edition Raises Bar for Regulatory Compliance", EMC SA Press Release on ITWeb, Jun. 23, 2003, pp. 1-2 (retrieved online Sep. 3, 2003) http://www.itweb.coza/sections/QuickPrint/Printasp?StoryID=134765.

EMC Corporation, "EMC Centera Compliance Edition", 2003, pp. 1-4.

EMC Corporation, "Centera Compliance Edition: Understanding and Addressing the Challenges of Compliance and Discovery", White Paper, Apr. 2003, pp. 1-10.

Machine Translation for JP 11-007401, published on Dec. 1, 1999, 38 pgs.

Abadi et al. REED Robust Efficient Filtering and Event Detection in Sensor Networks, Aug. 2005, ACM, pp. 769-780.

First Office Action for U.S. Appl. No. 10/681,558, dated Apr. 19, 2006, 19 pgs.

Response to First Office Action for U.S. Appl. No. 10/681,558, dated Jul. 19, 2006, 16 pgs.

Notice of Allowance for U.S. Appl. No. 10/681,558, dated Aug. 24, 2006, 7 pgs.

First Office Action for U.S. Appl. No. 11/465,594, dated Jun. 23, 2008, 8 pgs.

Response to First Office Action for U.S. Appl. No. 11/465,594, dated Sep. 23, 2008, 9 pgs.

Final Office Action for U.S. Appl. No. 11/465,594, dated Mar. 5, 2009, 16 pgs.

Response to Final Office Action for U.S. Appl. No. 11/465,594, dated Jul. 6, 2009, 9 pgs.

Notice of Allowance for U.S. Appl. No. 11/465,594, dated Sep. 14, 2009, 9 pgs.

Second Notice of Allowance for U.S. Appl. No. 11/465,594, dated Mar. 10, 2010, 8 pages.

Response to First Office Action for U.S. Appl. No. 12/785,361, dated May 5, 2011, 7 pgs.

Notice of Allowance for U.S. Appl. No. 12/785,361, dated Jun. 13, 2011, 12 pgs.

\* cited by examiner

METHOD, SYSTEM, AND PROGRAM FOR IMPLEMENTING RETENTION POLICIES TO ARCHIVE RECORDS

RELATED APPLICATIONS

This application is a continuation of U.S. patent application Ser. No. 12/350,198 filed on Jan. 7, 2009, entitled "Method, System, And Program For Implementing Retention Policies To Archive Records", which is a continuation of U.S. Pat. No. 7,526,621 filed Aug. 18, 2006, entitled "Method For Implementing Retention Policies To Archive Records", which is a continuation of U.S. Pat. No. 7,107,416 filed Dec. 15, 2003, entitled "Method, System, And Program For Implementing Retention Policies To Archive Records", which is a continuation-in-part of U.S. Pat. No. 7,146,388 filed on Oct. 7, 2003, entitled "Method, System, And Program For Archiving Files", and U.S. Pat. No. 7,117,322 filed on Sep. 8, 2003, entitled "Method, System, And Program For Retention Management And Protection Of Stored Objects", each of which is incorporated by reference herein.

TECHNICAL FIELD

The present disclosure relates to implementing retention policies for archive records.

BACKGROUND

Organizations may need to retain and archive electronic files (where a file comprises a document, record, or any other data structure storing code or data that may be represented in a hierarchical file system) in storage for an extended period of time due to internal corporate requirements or external regulatory or legal requirements. For instance, government regulators may require that certain files remain archived for a minimum period of time. Companies in regulated industries, such as securities and financial organizations, defense contractors, etc., may be required to archive certain documents. Further, government agencies may also be required to archive files. Yet further, organizations subject to a government proceeding, such as litigation, may also be subject to a file retention policy. An organization may also archive documents for backup and storage, and versioning. A storage system often includes some archival software to manage the archival of files at different locations that are retained according to a policy. Such archival software may maintain a database of archived files. Use of the archival software may require significant user training and management, as well as a stand alone application program. Archival software typically features customized graphical user interfaces (GUIs) and application program interfaces (APIs) to interface with the operating system to perform archival related operations.

One archival data storage technology referred to as WORM (for write once, read many) involves archiving data to a storage media, such as optical disks, that can only be written to once. One disadvantage of using optical disks is that their access rates are slow, especially when the disks are maintained in an auto-changer that needs to mechanically access a disk from a slot and insert the accessed disk into a disk drive to access.

To avoid some of the drawbacks of using optical disks, some archival system vendors are using inexpensive hard disk drives as the medium for archiving data. The hard disk drive storage system is sold bundled with software to expose the storage as a proprietary archive utility, requiring custom interfaces and application program interfaces to use the archival features.

SUMMARY

Disclosed herein are aspects of systems, methods, and apparatuses for electronic data retention.

An aspect is a method for use in electronic data retention. The method includes receiving, via electronic communication, a request indication indicating a request to delete, shred, purge, or remove a record from a data retention system; generating a determination, by a processor in response to instructions stored on a non-transitory storage medium, indicating that the record is associated with a hold indicator that is not based on a retention period; and sending, via electronic communication, a denial of the request in response to the determination indicating that the record is associated with a hold indicator that is not based on a retention period.

Another aspect is an apparatus for use in data retention. The apparatus includes a memory and at least one processor configured to execute instructions stored in the memory to: receive, via electronic communication, a request indication indicating a request to delete, shred, purge, or remove a record from a data retention system; generate a determination indicating that the record is associated with a hold indicator that is not based on a retention period; and send, via electronic communication, a denial of the request in response to the determination indicating that the record is associated with a hold indicator that is not based on a retention period.

Another aspect is a method for electronic data retention. The method includes receiving, via electronic communication, a request to delete, shred, purge, or remove a record from a data retention system; identifying, by a processor in response to instructions stored on a non-transitory storage medium, a hold indicator associated with the record; and on a condition that the hold indicator is not based on a retention period, sending, via electronic communication, an indication that the request is denied.

Variations in these and other aspects will be described in additional detail hereafter.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Applying a Retention Policy

Figure 1:
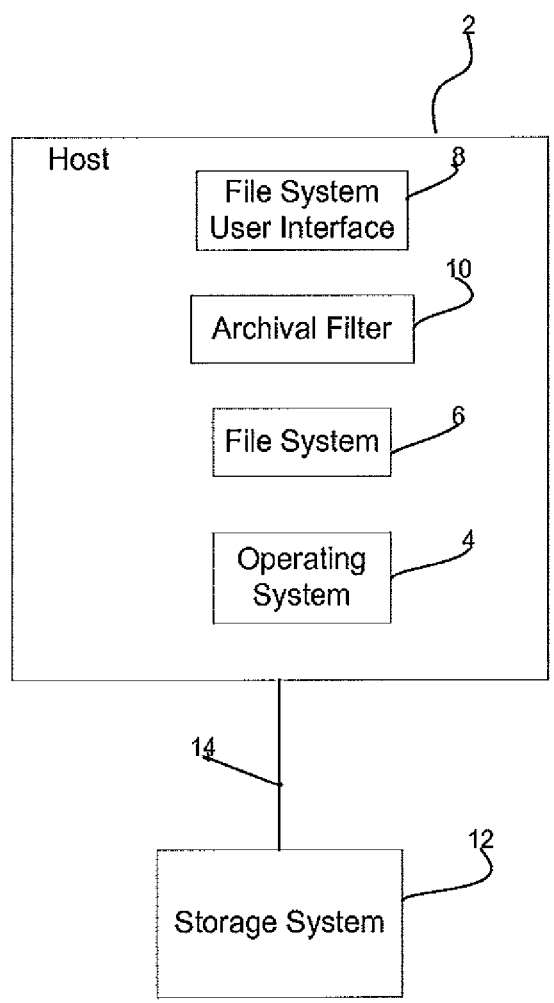
FIG. 1 illustrates a computing environment in which embodiments of the invention are implemented.

FIG. 1 illustrates a computing environment in which embodiments of the invention are implemented. A host system 2 includes an operating system 4 and a file system 6 that provides an organization of files stored in a storage device. The file system 6 may implement a hierarchical tree-like arrangement of files, which may involve the use of directories and subdirectories in which the files or records may be stored, where any directory may comprise a subdirectory of another directory or the root directory. A file system user interface 8 provides a command line or graphical user interface to enable the user to explore the file system and perform file system related operations, such as moving a file to a specified directory, deleting a file, renaming a file, creating a file, etc. The file system user interface 8 may comprise a file management program that renders a presentation of the hierarchical arrangement of files. The file system user interface 8 may comprise a stand-alone file management program or a file management function accessed through an application program.

An archival filter 10 intercepts user file requests generated through the file system user interface 8 directed to the file system 6 and determines whether any archival retention policies should block such user requested operation if necessary or allow the operation to proceed to the file system 6 to execute. The file system 6 may provide access to files stored in the storage system 12 via connection 14.

The host system 2 may comprise any computing device known in the art, such as a server class machine, workstation, desktop computer, etc. The storage system 12 may comprise any storage device known in the art, such one or more interconnected disk drives configured as a Redundant Array of Independent Disks (RAID), Just a Bunch of Disks (JBOD), Direct Access Storage Device (DASD), as a tape storage device, a single or multiple storage units, e.g., a tape library, or etc. The connection 14 may comprise any interface between storage and a host known in the art, such as a network connection (e.g., Ethernet, wireless Ethernet, Fibre Channel, etc.) or any other data transfer interface known in the art, e.g., Advanced Technology Attachment (ATA), Serial ATA (SATA), Small Computer System Interface (SCSI), etc., which may be external or internal to the host 2 enclosure.

Figure 2:
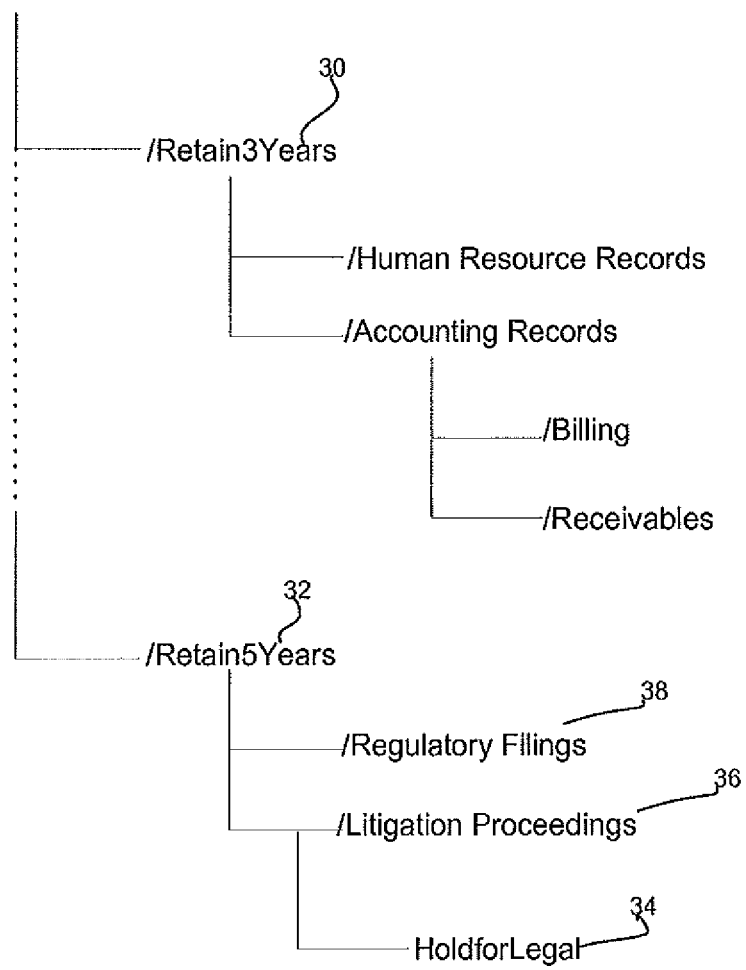
FIG. 2 illustrates an example of an arrangement of a hierarchical file system in accordance with implementations of the invention.

In certain embodiments, the archival filter 10 determines the retention policies based on a pathname of a directory associated with a retention policy. For instance, to indicate that files or records within a directory are to be retained for a specified time period, the user may name a directory "/RetainX", where X specifies a time period, e.g., years, days, months, etc. In certain implementations, the action of "retaining" a file may entail never allowing the file to be modified or updated in any circumstances, and only permitting erase and move operations. The retention policy indicated in the pathname of the directory would apply to any files or records stored within the directory having the retention pathname or any further subdirectory of the directory having the retention name. FIG. 2 illustrates a hierarchical tree file system in which data is organized having two directories 30 and 32. The archival policy specified in the pathnames of the retention directories 30 and 32 may apply to files stored in the retention directories 30 and 32 or any subdirectories defined therein. The user may use the file system user interface 8 to move files to a retention directory, such as by using an input device to "drag and drop" or otherwise move files from one directory to a retention directory 30 and/or 32 so that the retention policy will apply to the moved file.

Another example of a retention policy to use as the pathname is "RetainUntilX", which specifies that files in a retention directory having such a pathname will be retained until the specified date "X".

In this way, the user may use standard file management interfaces to associate a file with a retention policy by just copying or otherwise moving the desired file to a retention directory. With the described embodiments, specialized APIs or customized interfaces are not needed because a standard file management interface is used to specify the retention policies. Moreover, the user can define a retention policy by including descriptive language statements in the directory pathname, which are understood by the archival filter 10, that describe and specify the policy. This avoids the need for substantial training to instruct users on how to apply an archival policy to a file.

FIG. 2 illustrates an example of a hierarchical arrangement of directories, where the pathnames of the directories 30 and 32 provide a file retention policy to apply to all files in that directory. For instance any file within the directory 30 or a subdirectory of directory 30 will be retained for three years. When the date and time associated with a file, i.e., the last modification date, within the directory 30 is three years prior to the current date, then that file in the directory 30 may be deleted or moved without restriction. Similarly, any file in the path of a subdirectory of directory 32 will be retained for five years.

FIG. 2 also provides an example of a "hold" directory 34, which is a subdirectory of the retain directory 36 and litigation proceedings subdirectory 36. Any file moved to the hold directory 34 will not be allowed to be deleted, even after the expiration of the retention period indicated in the pathname of the directory 32. For instance, if certain files may be relevant to an imminent or pending litigation, then a hold directory 34 may be added as a subdirectory of the directory 36 to store files relevant to the litigation to prevent any files moved to the hold directory 34 from being deleted. A regulatory filings directory 38 archives files related to regulatory filings. In certain embodiments, a file in the hold directory 34 may be moved back to the directory from which it originated or another directory after the reason for the hold is no longer relevant.

Figure 3:
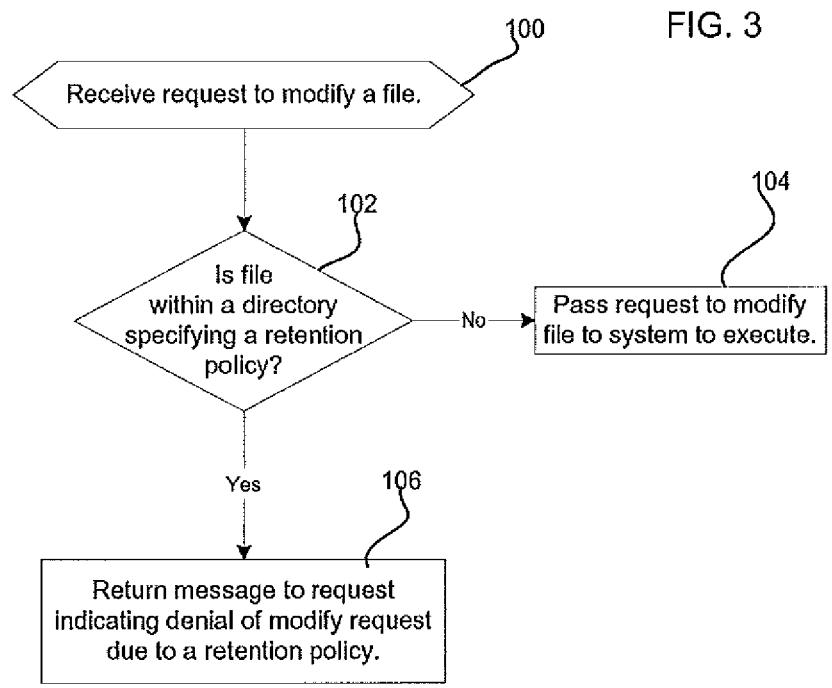
FIGS. 3, 4, and 5 illustrate an example of operations performed to manage archived files in accordance with implementations of the invention.

FIG. 3 illustrates operations performed by the archival filter 10 to determine whether an archive policy applies to an operation to modify a file represented in the file system 6. The archival filter 10 would intercept and process a modify request before the request is sent to the file system 6 to execute. Upon receiving (at block 100) the request to modify the target file, if (at block 102) the target file to modify is not within a retention directory (directly or within a further subdirectory thereof), then the archival filter 10 passes (at block 104) the modify request to the file system 6 to execute. If the target file is within a retention directory, then the archival filter 10 returns (at block 106) a message indicating denial of the erase request due to a retention policy. The message may include additional information such as the specifics of the retention policy and the pathname of the directory including the target file.

With the logic of FIG. 3, any request to modify a file, as opposed to erase the file, may be denied regardless of whether the archival policy applies. This bar on modifying archived files regardless of the retention policy would prevent the situation from occurring where a file whose retention period expired is modified and subsequently subjected to a new archival retention policy. If such modification were allowed, then the new archival policy may be applied when the assumption is that the file subjected to the new archival policy was the previously archived file, not an updated version thereof.

Figure 4:
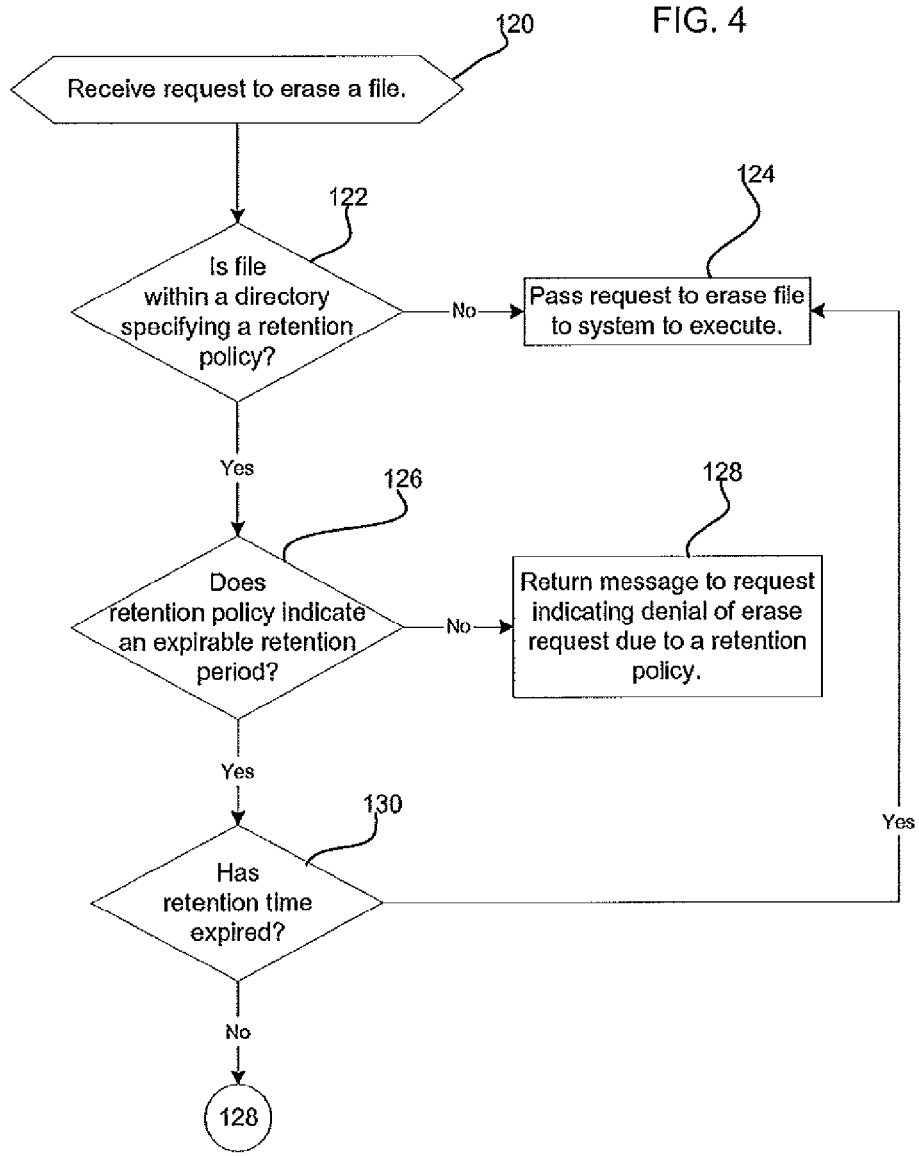

FIG. 4 illustrates operations performed by the archival filter 10 to determine whether an archive policy applies to an operation to erase a file represented in the file system 6. The archival filter 10 would intercept and process an erase request before the request is sent to the file system 6 to execute. Upon receiving (at block 120) the request to erase the target file, if (at block 122) the target file to erase is not within a retention directory (directly or within a further subdirectory thereof), then the archival filter 10 passes (at block 124) the erase request to the file system 6 to execute. If the target file is within a retention directory, then a determination is made (at block 126) as to whether the retention policy specified in the pathname of the directory indicates an expirable retention period. A retention policy that does not expire may be indicated in the directory pathname with "hold", retain forever, etc. If (at block 126) the retention policy does not expire, then the archival filter 10 returns (at block 128) a message indicating denial of the erase request due to a retention policy. The message may include additional information such as the specifics of the retention policy and the pathname of the directory including the target file. If (at block 126) the retention policy is for a defined, i.e., expirable, time period and if (at block 130) the retention period has expired, then control proceeds to block 124 to allow the erase request to proceed. Otherwise, if the retention period has not expired, then control proceeds to block 108 to return the message denying the erase request.

A retention period expires if the time period of the retention policy has been exceeded. For instance, if the retention period specifies a termination date, e.g., "RetainUntil Jan. 1, 2005", then the retention period expires on the specific date. Alternatively, if the retention time period specifies a time frame, e.g., "Retain 3 Years", then the retention period expires when the current time exceeds the retention time period plus the time the file was created, last modified or added to the retention directory.

With the logic of FIG. 4, an erase operation is not allowed to proceed if a file is within a retention directory and the retention policy has not expired with respect to that target file. Thus, files with different creation/last modification dates may expire at different times according to certain retention policies specified in the directory file name. In this way, the archival filter 10 filters all erase requests. In certain implementations, the archival filter 10 would pass all read requests to the file system 6 to execute.

Figure 5:
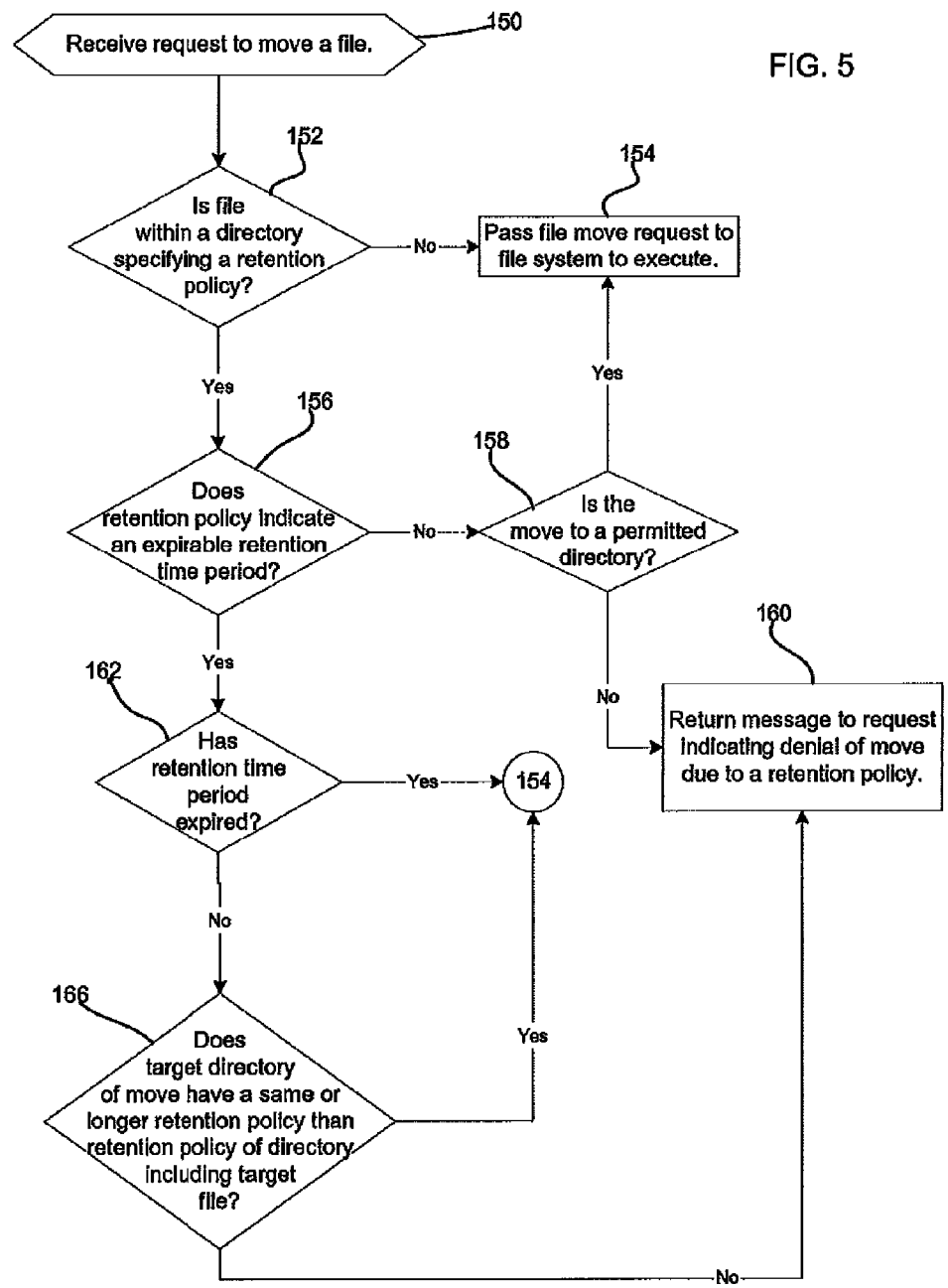

FIG. 5 illustrates operations performed by the archival filter 10 to process a request to move a target file from one directory to another. Upon receiving (at block 150) the request to move the target file, if (at block 152) the file is not within a directory whose file name specifies a retention policy, then the archival filter 10 passes (at block 154) the move request to the file system 6 to execute. If (at block 152) the target file is within a directory associated with a retention policy and if (at block 156) the retention policy does not specify an expirable retention time period, e.g., such as the case with the hold directory 34, then a determination is made (at block 158) whether the move is to a permitted directory. In certain implementations, a permitted target directory may be one whose files are associated with a retention policy that is as long or longer than the retention policy associated with the directory including the hold directory. For instance, in the example of FIG. 2, a file moved from the hold directory 34 would have to be moved to a directory having a retention policy of at least five years. In alternative implementations, a permitted directory may be associated with shorter retention time periods or no retention policies. If (at block 158) the move is to a permitted directory, then control proceeds to block 154 to pass the move command to the file system 6 to execute; otherwise, if the move is not to a permitted directory, then the archival filter 10 causes the return (at block 160) of a message indicating denial of the move due to a retention policy.

If (at block 156) the retention policy does provide an expirable (finite) time period and if (at block 162) the retention time period has expired, e.g., the specified termination date has passed or a termination period from the file date has expired, then control proceeds to block 154 to pass the move request to the file system 6 to execute. Otherwise, if the retention time period has not expired and if (at block 166) the target directory of the move has a same or longer retention policy than the retention policy of the directory currently including the target file, then control proceeds to block 154 to allow the file system 6 to execute the move request. If (at block 166) the target directory has a shorter retention time period than the current directory including the target file, the control proceeds to block 160 to deny the move request.

With the logic of FIG. 5, a file can be moved from a directory associated with a finite retention policy, i.e., one with an expirable time period, if the file is being moved to a directory having at least as long or longer than retention period. For instance, if a file is in a directory having a retain forever retention period, like the hold directory 34 (FIG. 2), then a file in that hold directory may only be moved to another hold directory also having the retain forever retention period. Further, if the file being moved is in a higher level directory, which contains the hold directory, then the file can only be moved to a hold directory within a higher level directory having the same or longer retention period of the higher level directory including the file subject to the move. This ensures that the file initially associated with the retention policy is retained for the specified period even after being moved. In further implementations, there may be a special directory for archived files removed from a retention directory to allow tracking of any files removed from the retention archives.

Certain of the described implementations provide techniques for using a standard file system interface to allow the user to implement a non-re-writable and non-erasable archival system, thereby avoiding the need to install, train for, and use a separate stand alone application program. With certain of the described implementations, the user specifies retention policies by associating retention policies with directories of the file system including the archived files to implement a non-re-writable and non-erasable environment.

Event Based Retention

Figure 6:
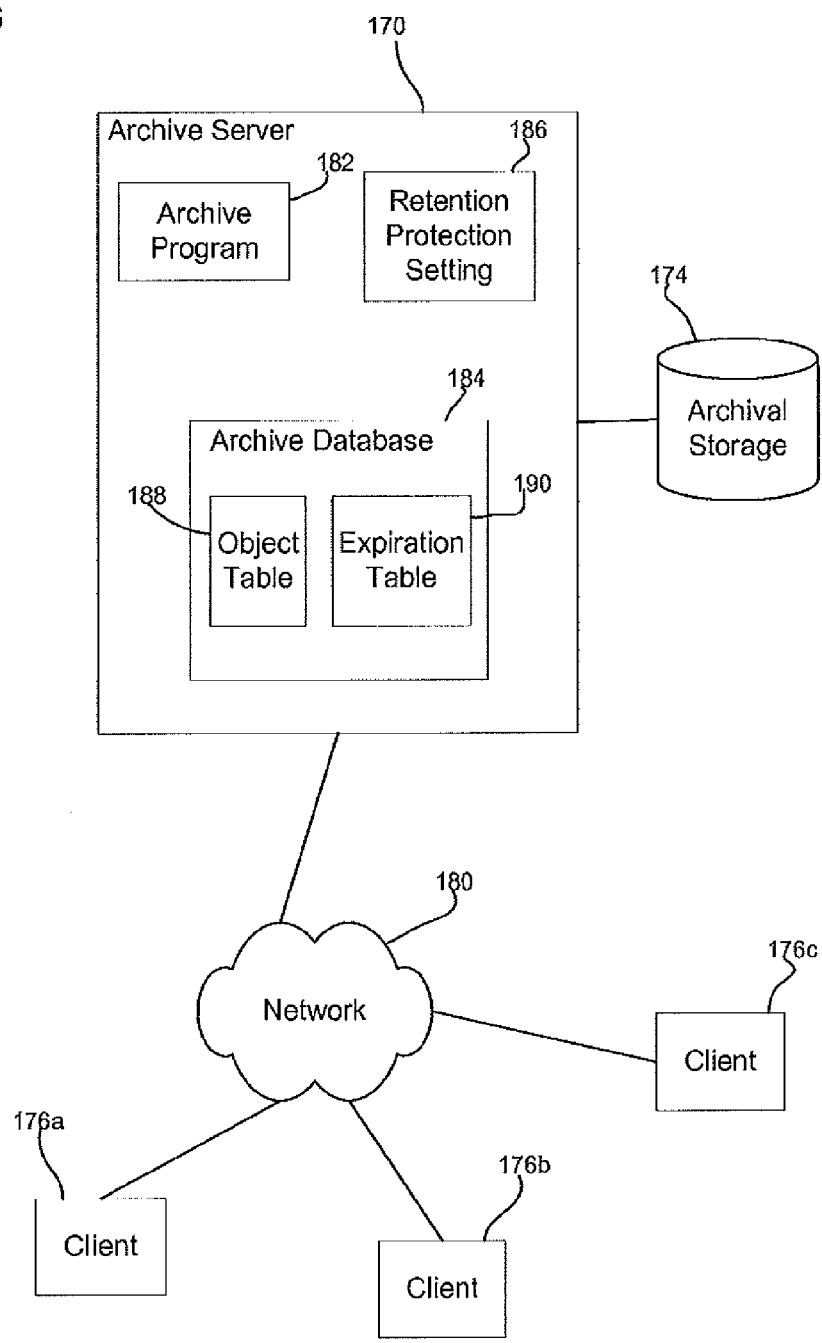
FIG. 6 illustrates an alternative implementation of the archival system in accordance with implementations of the invention.

FIG. 6 illustrates an additional computing environment in which embodiments of the invention are implemented. An archive server 170 maintains archive objects in archival storage 174, where the archived objects may originate from client systems 176a, 176b, 176c, where the clients 176a, 176b, 176c communicate objects to the archive server 170 over a network 180. The archive server 170 includes an archive program 182 which performs archive related operations, an archive database 184 maintaining records providing information on archived objects, and a retention protection setting 186 controlling the extent to which the archive program 182 permits users to remove or modify information in the archive database 184 and archived objects from the archival storage 174. In FIG. 6, the retention protection setting 186 comprises a global variable applying across all objects. In additional implementations, there may be separate protection settings for single objects or groups of objects, all objects in a node, filespace, from a client, etc. An object may comprise any data structure known in the art including data, such as a file, database, record, etc. All archive related operations are managed by the archive program 182 to ensure compliance with a configured archival policy. The archive database 184 may include an object table 188 having an entry (record) for each archived object providing information on the object and an expiration table 190 having one entry (record) for each initiated or expired retention period running with respect to one archived object.

The archive server 170 may be implemented as a server class machine, and the client systems 176a, 176b, 176c may comprise any computing device known in the art, such as a server class machine, mainframe, workstation, desktop computer, handheld computer, etc. The data archived from the client systems 176a, 176b, 176c may comprise data in a database, application program data, files in a file system, etc. The archival storage 174 may comprise any mass storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, or etc. The network 180 may comprise any interface between storage and a host known in the art, such as a network connection (e.g., Ethernet, wireless Ethernet, Fibre Channel, etc.) or any other network or storage transfer protocol known in the art.

In certain embodiments, different archival policies may be associated with the archived objects. The retention policy specifies a retention period during which the object must be maintained in archival storage 174. Following the duration of the retention period, the archived object is expired to allow the storage space to be reclaimed during a clean-up, reclamation or other space management operation. The object and the corresponding object entry in the object table 188 and any expiration entry for the object are removed. With certain archival policies, the retention period may commence immediately when adding the object to the archival storage and an entry to the archived database 184 providing information on the archived object.

An event based retention archival policy specifies that the retention period for the object does not commence until the occurrence of an event. Upon receiving a signal of the occurrence of the event, the archive program 182 would begin the retention period for the object having such event based retention archival policy. An event driven policy thus defers the beginning of the retention period counting until the occurrence of an event. For instance, employee information may be archived, but regulations may specify that after an employee leaves, information for that employee must be archived for a retention period of specified number of years. In such case, the event based retention policy may specify to commence the retention period upon being alerted of the event, which may comprise the separation of the employee from the organization. A retention period of zero for an event based retention policy would mean that the object expires immediately upon occurrence of the event. Further, an event based retention policy may specify a minimum retention period, in addition to the general retention period, such that the object cannot be expired before the minimum retention period expires, regardless of the event based retention period. Thus, if the time that has passed since the event signal occurs and the retention period time is less than the minimum retention period, then the object will not expire until the end of the minimum retention period. The minimum retention period may run from the time the object entry was added to the archive database 184 and storage 174, whereas the general event based retention period runs from when the event signal is received.

A deletion hold policy may be specified for an object to override the retention policy to prevent removal of an object even if the object would have expired according to the retention period defined in the archival policy for the object. Thus, if some event occurs that requires that the object remain archived regardless of any previously defined archival policy, then a deletion hold policy may be placed on that object to prevent expiration and removal of the archived object. For instance, if litigation commences against an employee that has departed, where an event based retention period is defined for the records of that employee to begin running when the employee departs (the event), then a deletion hold policy placed on the archived objects for that employee would prevent the expiration and removal of the archived objects for that employee regardless of the event based retention policy. The deletion hold applied to an archived object may subsequently be removed to allow that object to expire according to the archival policy defined for that object.

Further, a retention protection policy may be applied to the archive server 2 by setting the retention protection setting 186. Activating this setting 186 would cause the archive program 182 to inhibit or deny any request that seeks to remove or modify an archived object or remove any record in the archive database 184 for an archived object that has not expired according to the archive policy. A request to remove an archived object can be in the form of a request to remove that specific archived object or delete a volume or filespace including the specified archived object.

Further details of managing an event based retention policy are disclosed in the patent application entitled "Method, System, And Program For Retention Management And Protection Of Stored Objects", having U.S. application Ser. No. 10/658,487, which application was incorporated herein by reference above.

Determinate and Indeterminate Retention of Files

FIGS. 7-11 provide an additional implementation for applying a retention policy to records or files that may alternatively be implemented by the archival filter 10 in FIG. 1 to apply a retention policy for records in the operating system 4.

Figure 7:
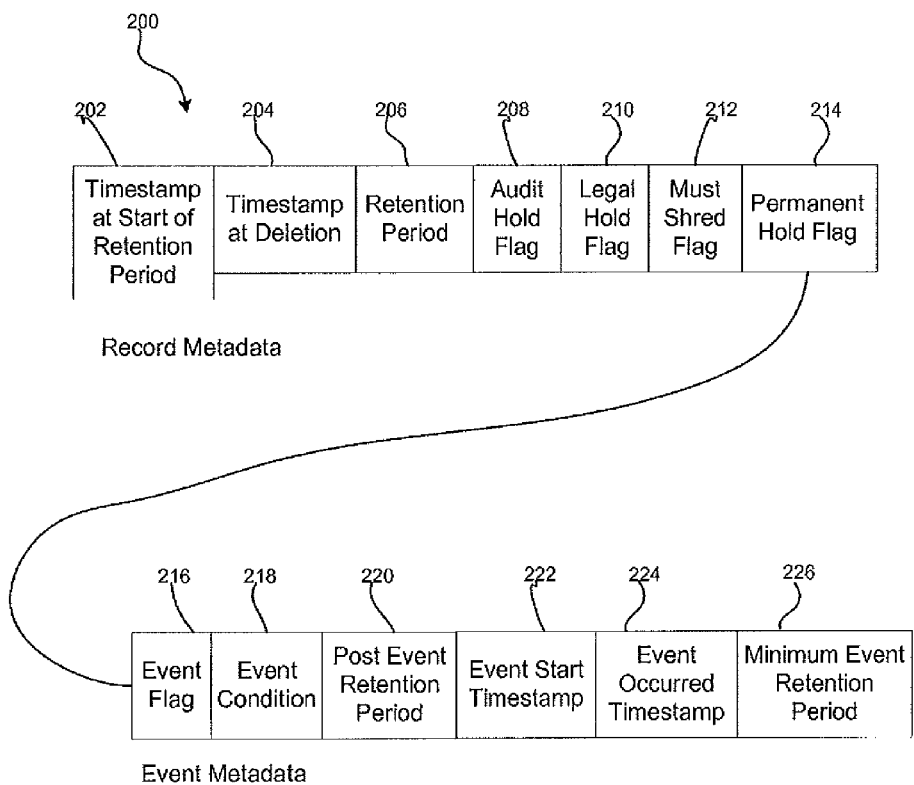
FIG. 7 illustrates metadata on a record providing information on a retention policy associated with that record in accordance with implementations of the invention.

FIG. 7 illustrates metadata 200 that may be associated with each record subject to a retention policy. Alternatively, the metadata may be associated with a subdirectory, i.e., retention directory, so that the retention policy specified by the retention policy applies to all files in that directory in the file system 6 (FIG. 1). The metadata 200 includes:

Timestamp at Start of Retention Period 202: indicates a time a retention period policy begins to apply to a record.

Timestamp at Deletion 204: indicates a time the record was deleted.

Retention Period 206: indicates a time period during which the record is retained and not subject to removal, including shred, delete, purge. This retention period expires when the timestamp at the start of the retention period 202 plus the retention period 206 exceeds a current system timestamp.

Audit Hold Flag 208: A flag indicating that any retention period is suspended and that the file cannot be removed due to an audit occurring.

Legal Hold Flag 210: A flag indicating that any retention period is suspended and that the file cannot be removed due to instigation of legal or regulatory proceedings.

Must Shred Flag 212: A flag indicating that when deleting the record, the system will automatically shred the record Permanent Hold Flag 214: A flag indicating that the record is in the permanent hold (PH) state and can never be deleted or shredded.

The metadata record 200 would further include an instance of multiple fields, shown as fields 216 through 226, for each event retention policy assigned to that record, such that a record may be associated with multiple event retention policies. The event metadata fields set for event included with the record metadata 200 include:

Event Flag 216: A flag indicating whether an event based retention policy is associated with the record.

Event Condition 218: The condition that must occur for the event to occur. The event may be specified by a database trigger. The event may comprise a condition occurring with respect to a person or organization related to the record. For instance, the event may comprise a user closing their account, separating from a company, etc., or performing any other action which would affect the status of one or more records related to their activity. The event flag 216 is set to "off" after the event condition occurs and is set to "on" before the event condition is satisfied.

Post Event Retention Period 220: indicates a retention period that is effective upon the event condition being satisfied. For instance, the post event retention period 220 may be specified to prevent removal of the record for a number of years after the user closes their account. The post event retention period 220 expires when the timestamp at the time the event occurred 224 plus the post event retention period 220 exceeds the current system timestamp.

Event Start Timestamp 222: indicates a time when the event flag 216 was set.'

Event Occurred Timestamp 224: indicates a time when the event signal is received indicating the event occurred. This signal may originate from a database program, such as a database trigger, from any application program or from user input action.

Minimum Event Retention Period 226: indicates the minimum amount of time from the event start timestamp 222 that the record must be maintained. If the event occurs before the minimum event retention period has expired, then the record is maintained until the minimum event retention period has expired, even if the post event retention period 220 has expired.

Figure 8:
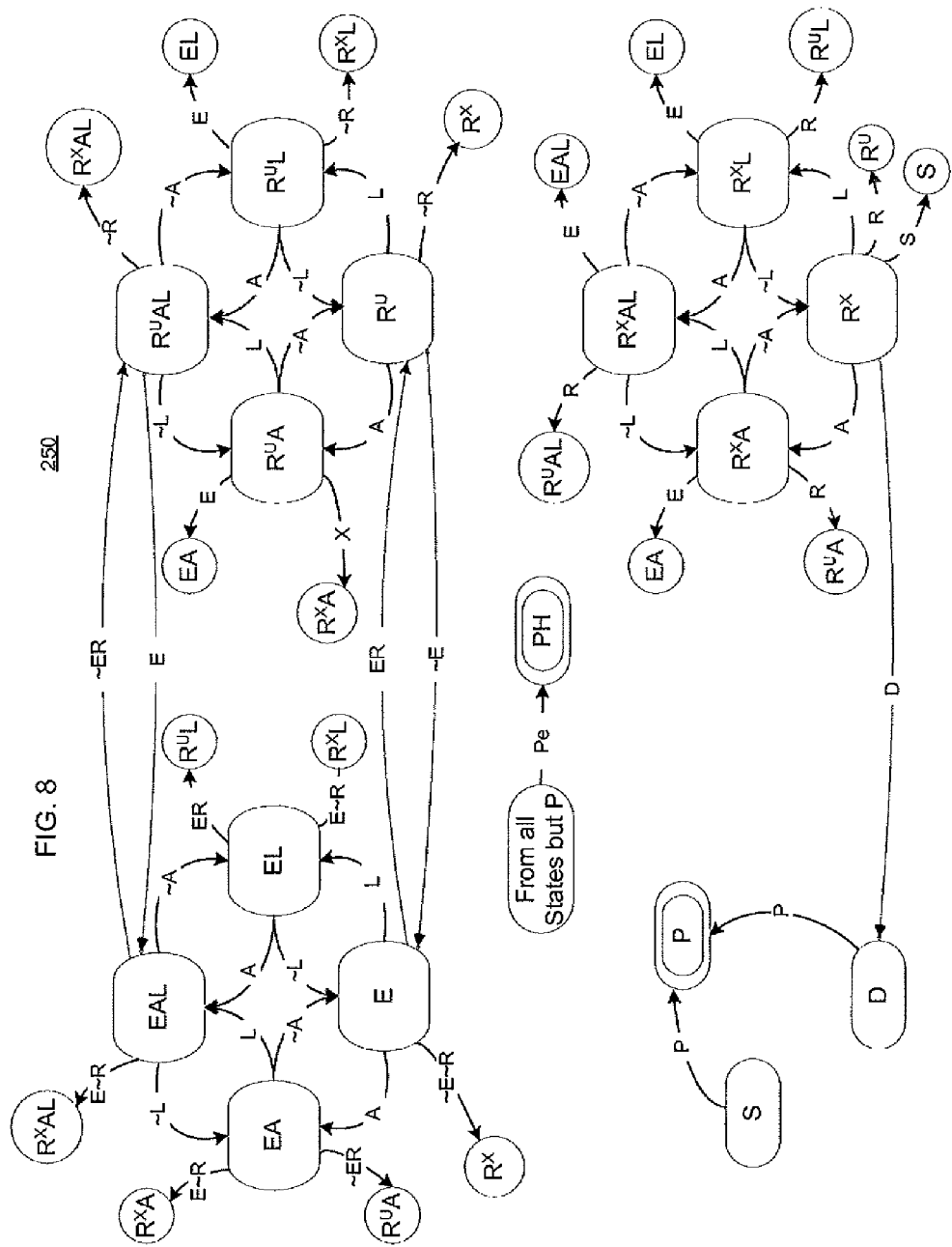
FIG. 8 illustrates a retention policy state machine in accordance with implementations of the invention.

FIG. 8 illustrates a state machine 250 that may be implemented in the archival filter 10 to determine the state of a record and whether the file may be deleted (D), shredded (S) or purged (P) depending on the retention policies indicated in the metadata 200 for the record. Following are possible states of a record as indicated in the state machine 250 (FIG. 7):

E: a record whose metadata 200 has the event flag 216 set "on" indicating an event condition that is unsatisfied and, optionally, a post event retention period 220.

$R^U$: a record having an unexpired retention period 206 of a duration indicated by the retention period 206.

$R^x$: a record whose retention period 206 has expired, has no pending event condition, and is eligible for deletion.

Further, if a file enters the system with no retention period, the file's initial state is the $R^x$ state.

EA: a record whose event flag 216 is set, indicating an event condition 218 is unsatisfied for the record, and the record audit hold flag is set indicating that the record is subject to an audit hold.

EL: A record whose event flag 216 is set "on", indicating that an event condition 218 is unsatisfied for the record, and that the record is subject to a legal hold. EAL: A record whose event flag 216 is set, indicating that an event condition 218 is unsatisfied for the record, and that the record is subject to both legal and audit holds.

$R^uA$: a record having an unexpired retention period 206 whose retention period 206 is suspended while the record is subject to an audit hold.

$R^uL$: a record having an unexpired retention period 206 whose retention period 206 is suspended while subject to a legal hold.

$R^uAL$: a record having an unexpired retention period 206 whose retention period 206 is suspended while subject to both audit and legal holds.

$R^xA$: a record whose retention period 206 is expired, i.e., is zero, has no associated event condition 218, but that cannot be removed due to an audit hold. Further, if a file enters the system with an audit hold and no retention period 206, then the file's initial state is the $R^xA$ state.

$R^xL$: a record whose retention period 206 is expired, i.e., is zero, has no associated event condition 218, but that cannot be removed due to a legal hold. Further, if a file enters the system with a legal hold and no retention period 206, then the file's initial state is the $R^xL$ state.

$R^xAL$: a record whose retention period is expired, i.e., is zero, has no associated event condition, but that cannot be removed due to audit and legal holds. Further, if a file enters the system with an audit and legal holds and no retention period, then the file's initial state is the $R^xAL$ state D: a record that is deleted.

S: a record that is shredded, i.e., all the bits are overwritten and then deleted.

P: a record whose metadata 200 is deleted. Further, the purge state is a final state.

PH: a record subject to a permanent hold, where the record cannot expire, be deleted or have its retention policies ever altered. The permanent hold state is a final state.

The possible initial states include any of the above states except delete (D), shred (S) or purge (P). Further, all states are optional. Below are the state transitions that cause a transition from one state to another as shown in the state machine 250 (FIG. 8):

A: audit hold is placed on the record.

A: audit hold is removed from a record

L: legal hold is placed on the record.

-L: legal hold is removed from a record

E: an event condition 218 is associated with a record, a record previously not associated with an event condition 218 or whose event condition 218 was previously satisfied is now currently associated with an event condition or an additional event condition 218 is associated with a record with an existing event condition 218.

-E: an event condition 218 associated with a record is satisfied.

R: a retention period 206 is associated with a record.

-R: a retention period 206 has expired with respect to a record.

D: indicates receipt of a command to transition to a delete state where the record is deleted. Receiving a deletion transition at all states except the expired retention period state ($R^x$) causes a transition back to the current state. Transition to the delete state is only allowed from the expired retention period state ($R^x$).

S: indicates receipt of a command to transition to a shred state where the record is shredded, i.e., all the bits are overwritten one or more times and then deleted. Receiving a shred transition at all states except the expired retention period state ($R^x$) causes a transition back to the current state. Transition to the shred state is only allowed from the expired retention period state ($R^x$).

P: indicates receipt of a command to transition to a purge state where the metadata 200 (FIG. 7) for a record is deleted. Receiving a purge transition at all states except the delete (D) or shred (S) states causes a transition back to the current state. Transition to the purge state is only allowed after the record has been shredded or deleted.

Pe: indicates a transition to the permanent hold state. A "Pe" transition from any but the purge (P) state goes to the permanent hold state (PH), and a "Pe" transition from the delete (D) or shred (S) state results in the metadata being kept permanently. A "Pe" transition from the purge (P) state returns to the purge (P) state.

FIG. 8 illustrates a state machine that shows how a record may transition from one state to another depending on the occurrence of one of the above described state transitions. In the described implementations, there are twelve transitions set forth above. In FIG. 8, all transitions from a state to a different state are shown, and all transitions from a state back to itself, i.e., no state change are implicit in that all loop-back transitions are assumed to be those of the twelve transitions not specifically shown. Further, the state machine shows that a permanent (Pe) transition from any state except the purge (P) state transitions to the permanent hold (PH) state.

Figure 9:
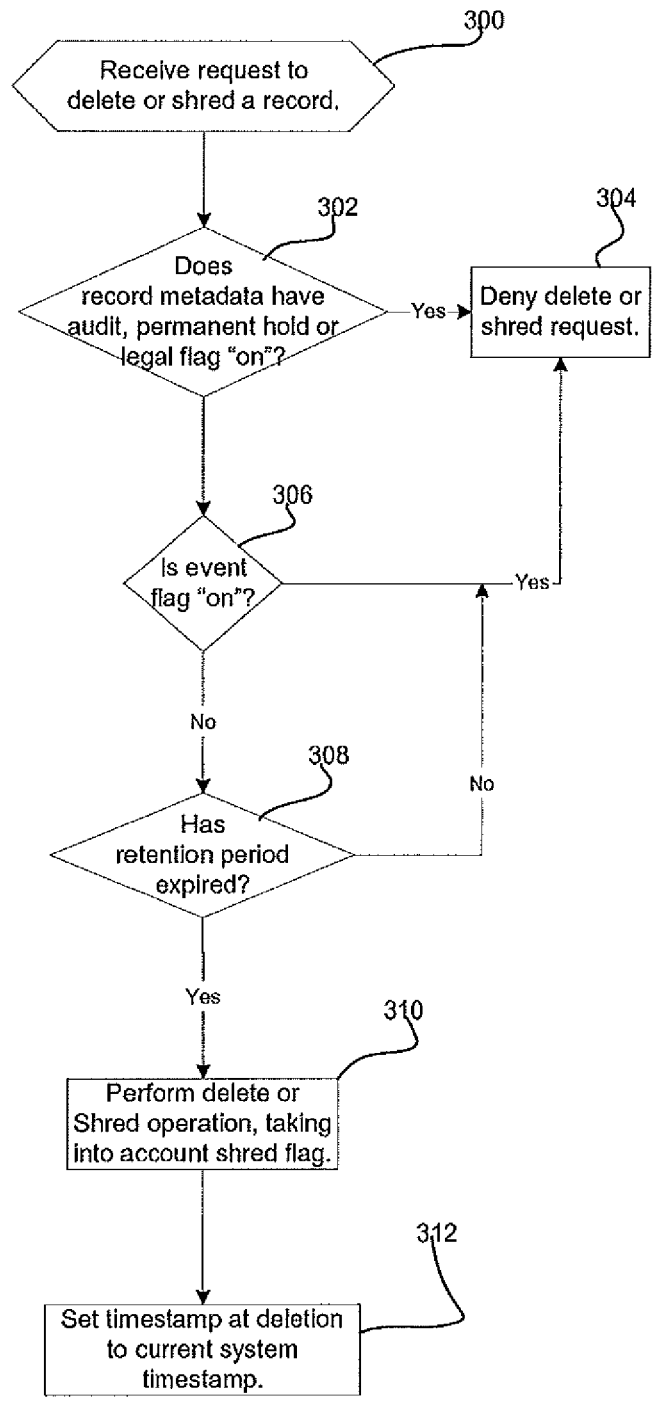
FIGS. 9, 10, and 11 illustrate operations performed to implement a retention policy in accordance with implementations of the invention.
Figure 10:
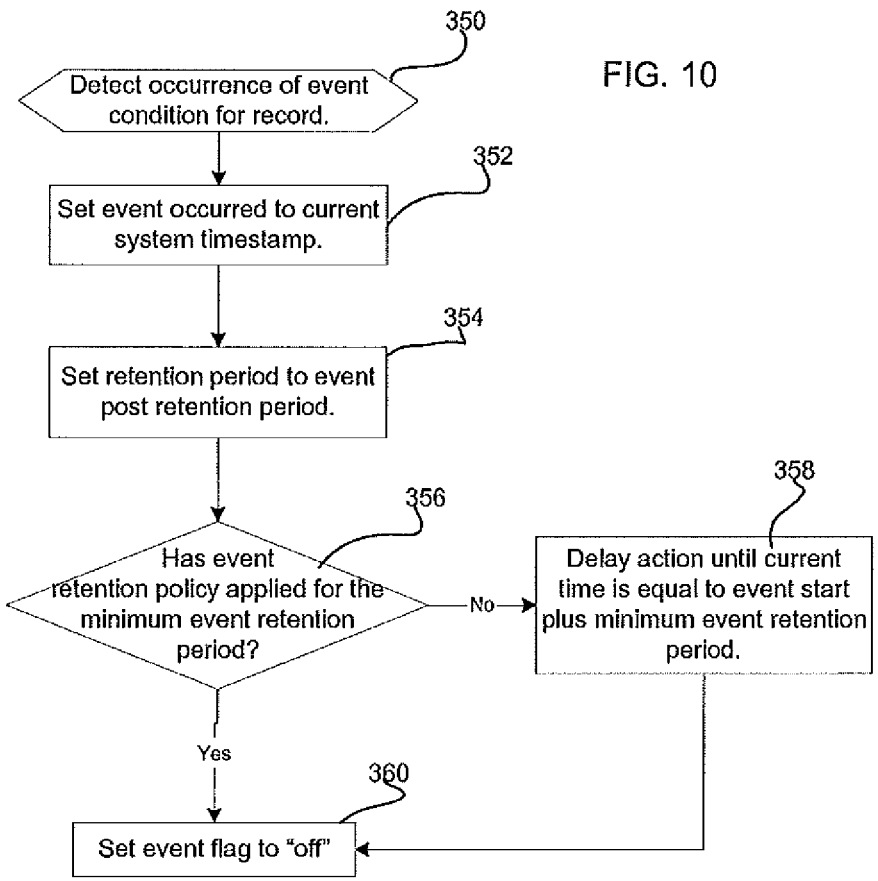
Figure 11:
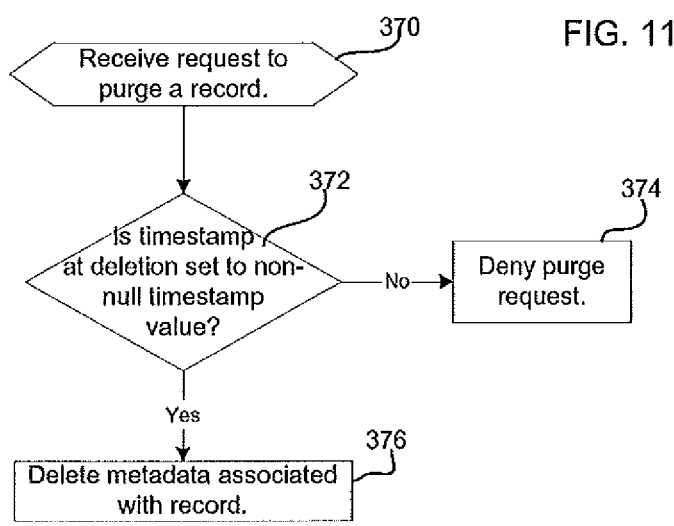

FIGS. 9, 10, and 11 illustrate operations performed to implement the state machine 250 of FIG. 8. With respect to FIG. 9, upon receiving (at block 300) a command to delete or shred a record from the file system 6, the archival filter 10 (FIG. 1) determines (at block 302) whether the metadata 250 for the record has the audit hold flag 208, legal hold flag 210 or permanent hold flag 214 set "on". If so, then the delete or shred request is denied (at block 304), which corresponds to receiving the delete (D) or shred (S) request at states EAL, EA, EL, $R^UAL$, $R^UA$, $R^UL$, $R^XAL$, $R^XA$, $R^XL$ (FIG. 8). If (at block 302) all hold flags 208, 210, 214 are "off" and if (at block 306) the event flag is "on", indicating that an event condition 210 associated with the record has not yet been satisfied, i.e., state "E", then the request is denied (at block 304). If (at block 308) the retention period has not expired, i.e., the current system timestamp is less than the timestamp at the start of the retention period 202 plus the retention period 206, then the request is denied (at block 304), i.e., state $R^U$. Otherwise, if the retention period has expired, i.e., the $R^x$ state, then the delete (D) or shred (S) operation is performed (at block 310), leading to the S or D state. The timestamp at deletion 204 is then set to the current system time. If the removal operation is a delete (D) and the must shred flag 212 is "on", then the record would be shredded.

With the described implementations, every record has an explicit or implicit retention period, including: a retention period of zero where the record may be removed, i.e., in the $R^x$ states; an indefinite retention period such as those subject to a hold, e.g., an audit (A) and/or legal (L) hold; a determinate retention period such as for a specified period of time, i.e., one of the $R^U$ states; or a record subject to retention until the occurrence of an event, i.e., one of the E states. If a record subject to an event condition 210 has an event retention period 214 of zero, then upon the occurrence of the condition the retention period would end and the record may be subject to removal.

FIG. 10 illustrates operations performed by archival filter 10 or some other component, such as a database program, to handle the occurrence of an event condition, such as an employee leaving, account being closed. This may occur asynchronously with respect to users attempting to delete files or may occur when a delete request is received before the event flag 216 is checked (at block 306, in FIG. 9). Upon detecting (at block 350) the occurrence of an event condition 218 for a record, the event occurred timestamp field 224 is set (at block 352) to the current system timestamp. The retention period 206 is set (at block 354) to the post event retention period 220 to prevent removal of the file until the post event retention period 220 has expired. If (at block 356) the event retention policy for which the signal was received has not applied for the minimum event retention period 226, i.e., the current system time is not greater than the event start timestamp 222 plus the minimum event retention period 226, then action taken on the event occurrence is delayed (at block 358) until the current system time is equal to the event start timestamp 222 plus the minimum event retention period 226. From the yes branch of block 356 or block 358, control proceeds to block 360 where the event flag 216 is set (at block 360) "off".

FIG. 11 illustrates operations performed by the archival filter 10 to process a request to purge the metadata 200 for a record. Upon receiving (at block 370) the purge request, if (at block 372) the timestamp at deletion 204 is set to a non-null timestamp value, which would occur when the record is shredded or deleted, then the metadata 200 associated with the record is deleted; otherwise, the purge request is denied.

Described embodiments provide techniques for managing files subject to a retention policy that are not to be removed for certain organizational reasons, such as until a certain event occurs, if the record is related to activity subject to legal and/or an audit, etc. This allows organizations or individuals to prevent inadvertent or malevolent deletion of records during the retention period.

Additional Embodiment Details

The retention policy management system described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain described implementations, the user associates a retention policy with a directory by indicating a retention policy code in the name of the directory to apply to all files included in that directory. In alternative implementations, the user may associate a retention policy with a directory in a manner other than coding the pathname of the directory. For instance, the user may associate retention policies with the attributes defined for a directory of the file system, which may or may not be indicated in the name of the directory or graphical rendering of the directory in a graphical user interface providing a rendering of the hierarchical file system. In certain operating systems, such as the MICROSOFT WINDOWS operating system, the attributes that may be assigned to a directory are accessed by right clicking a mouse button over the name of the directory displayed in a user interface window to display a menu, and then selecting the properties option displayed in the menu. (Microsoft and Windows are registered trademarks of Microsoft Corporation).

In certain described implementations, the archival filter 10 is shown as a separate program component. The archival filter 10 may be installed separately from the file system 6, such as a separately installed application program that runs when the operating system 4 and file system 6 are initialized and screens files the user is attempting to erase or move. Alternatively, the functionality of the archival filter may be incorporated directly in the operating system and be made available as a feature of the file system installed with the operating system. The archival filter 10 may execute in the kernel of the operating system or at different priority levels.

In described implementations, a retention policy associated with a directory applied to all files within that directory, including files in subdirectories of the directory associated with the retention policy. In further implementations, certain subdirectories within the retention policy directory may include files not subject to the retention policy, such as the case with a hold directory grouping files that are retained indefinitely, irrespective of any retention policy associated with a directory in which the hold directory is included.

In described implementations, a non-re-writable and non-erasable type restriction policy is applied to files in a directory associated with the retention policy for the time period specified by the retention policy. In alternative implementation, different retention restrictions may be applied to files subject to the retention policy.

In described implementations, the coding of the retention policy in the directory pathname comprised a description of the retention policy. In alternative implementations, the coding of the retention policy in the pathname may comprise a code that is not descriptive of the retention policy. For instance, the pathname may be coded with "Retain3Years", which is a description of the retention policy, or a non-descriptive code, e.g., "X11", which may not provide any description of the actual retention policy.

FIGS. 3, 4, 5, 9, 10, and 11 describe specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

FIG. 7 illustrates information that may be included with the metadata 200 for a record. Additional or different metadata information may be used to manage the retention policy and allow for event driven and other policy related holds, such as legal and audits. Further, additional organizationally defined retention holds may be provided other than audit and litigation.

FIG. 8 illustrates an implementation of a state machine including defined possible states for a record subject to a retention policy and transitions between states. In alternative implementations, additional states may be provided and alternative and different transitions may be used to provide different transitions among states than shown in the state machine of FIG. 8.

Figure 12:
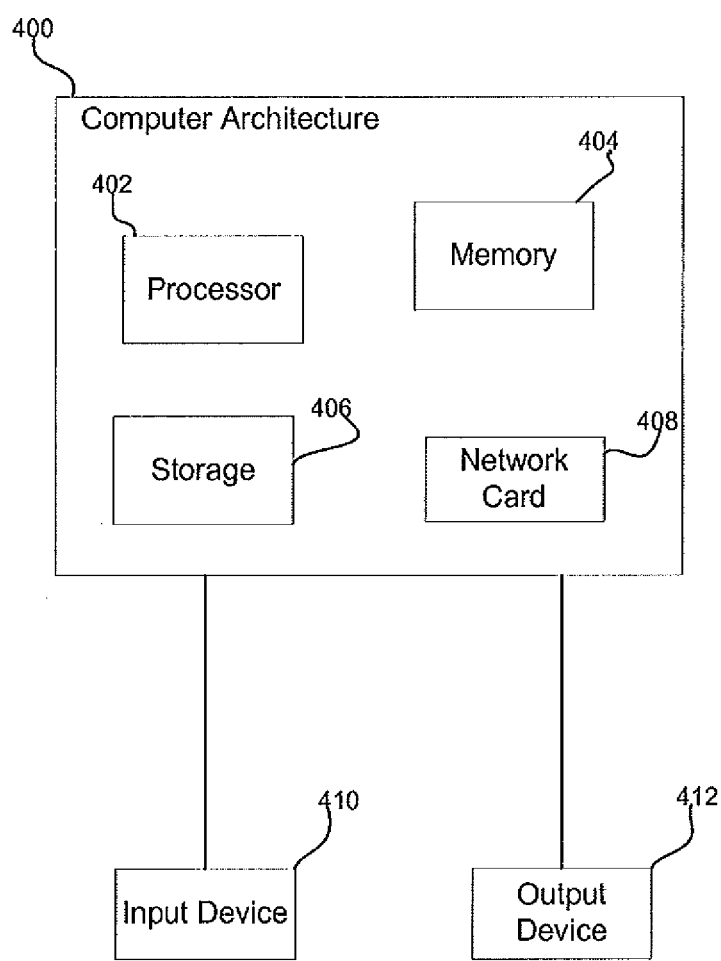
FIG. 12 illustrates a computing architecture that may be used to implement the computing environments described with respect to FIGS. 1 and 6.

FIG. 12 illustrates one implementation of a computer architecture 400 of the host system 2 shown in FIG. 1. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for use in electronic data retention, the method comprising:
   receiving, via electronic communication, a request indication indicating a request to delete, shred, purge, or remove a record from a data retention system;
   generating a determination, by a processor in response to instructions stored on a non-transitory storage medium, indicating that the record is associated with a hold indicator that is not based on a retention period; and
   sending, via electronic communication, a denial of the request in response to the determination indicating that the record is associated with a hold indicator that is not based on a retention period.

2. The method of claim 1, wherein the hold indicator is associated with a retention policy that does not expire.

3. The method of claim 1, wherein the hold indicator is associated with an audit indicator or a litigation indicator.

4. The method of claim 1, wherein the request indication indicates a request to delete, shred, purge, or remove information associated with the record.

5. The method of claim 1, further comprising:
generating a determination, by a processor in response to instructions stored on a non-transitory storage medium, indicating that the record is associated with an unexpired retention period; and
sending, via electronic communication, a denial of the request in response to the determination indicating that the record is associated with an unexpired retention period.

6. The method of claim 1, further comprising:
generating a determination, by a processor in response to instructions stored on a non-transitory storage medium, indicating that the record is associated with an unsatisfied event condition; and
sending, via electronic communication, a denial of the request in response to the determination indicating that the record is associated with an unsatisfied event condition.

7. The method of claim 1, wherein the hold indicator indicates that the record is associated with a suspended retention period, an expired retention period, or a satisfied event condition.

8. The method of claim 1, wherein receiving the request includes receiving the request in response to user input or in response to an event.

9. An apparatus for use in data retention, the apparatus comprising:
a memory; and
a processor configured to execute instructions stored in the memory to:
receive, via electronic communication, a request indication indicating a request to delete, shred, purge, or remove a record from a data retention system;
generate a determination indicating that the record is associated with a hold indicator that is not based on a retention period; and
send, via electronic communication, a denial of the request in response to the determination indicating that the record is associated with a hold indicator that is not based on a retention period.

10. The apparatus of claim 9, wherein the hold indicator is associated with a retention policy that does not expire.

11. The apparatus of claim 9, wherein the hold indicator is associated with an audit indicator or a litigation indicator.

12. The apparatus of claim 9, wherein the request indication indicates a request to delete, shred, purge, or remove information associated with the record.

13. The apparatus of claim 9, wherein processor is configured to execute instructions stored in the memory to:
generate a determination indicating that the record is associated with an unexpired retention period; and
send, via electronic communication, a denial of the request in response to the determination indicating that the record is associated with an unexpired retention period.

14. The apparatus of claim 9, wherein processor is configured to execute instructions stored in the memory to:
generate a determination indicating that the record is associated with an unsatisfied event condition; and
send, via electronic communication, a denial of the request in response to the determination indicating that the record is associated with an unsatisfied event condition.

15. The apparatus of claim 9, wherein the hold indicator indicates that the record is associated with a suspended retention period, an expired retention period, or a satisfied event condition.

16. The apparatus of claim 9, wherein the processor is configured to execute instructions stored in the memory to receive the request in response to user input or in response to an event.

17. A method for use in electronic data retention, the method comprising:
receiving, via electronic communication, a request to delete, shred, purge, or remove a record from a data retention system;
identifying, by a processor in response to instructions stored on a non-transitory storage medium, a hold indicator associated with the record; and
on a condition that the hold indicator is not based on a retention period, sending, via electronic communication, an indication that the request is denied.

18. The method of claim 17, wherein the hold indicator is associated with a retention policy that does not expire.

19. The method of claim 17, wherein the hold indicator is associated with an audit indicator or a litigation indicator.

20. The method of claim 17, wherein the hold indicator indicates that the record is associated with a suspended retention period, an expired retention period, or a satisfied event condition.

* * * * *